United States Patent
Solmonson et al.

(10) Patent No.: US 7,338,026 B1
(45) Date of Patent: *Mar. 4, 2008

(54) DEVICE FOR KEEPING AND SERVING ICE CREAM

(76) Inventors: Joe Solmonson, 360 Sue Ellen La., Roseberg, OR (US) 97470; Michelle Solmonson, 360 Sue Ellen La., Roseberg, OR (US) 97470

( * ) Notice: Subject to any disclaimer, the term of this patent is extended or adjusted under 35 U.S.C. 154(b) by 31 days.

This patent is subject to a terminal disclaimer.

(21) Appl. No.: 11/256,447

(22) Filed: Oct. 24, 2005

(51) Int. Cl.
*A23G 9/28* (2006.01)

(52) U.S. Cl. .................. 249/92; 425/118; 425/187; 425/318

(58) Field of Classification Search ............. 249/92, 249/121; 425/118, 187, 221, 278, 318; 222/80
See application file for complete search history.

(56) References Cited

U.S. PATENT DOCUMENTS

| | | | | |
|---|---|---|---|---|
| 3,230,926 A | * | 1/1966 | Macmanus | 118/24 |
| 3,987,941 A | * | 10/1976 | Blessing | 222/386 |
| 4,239,175 A | * | 12/1980 | Straubinger | 249/92 |
| 4,376,622 A | * | 3/1983 | Coffey | 425/139 |
| 4,443,176 A | * | 4/1984 | Battistone | 425/276 |
| 4,796,784 A | * | 1/1989 | Spirk et al. | 222/80 |
| 4,850,833 A | * | 7/1989 | Pinto et al. | 425/6 |
| 5,354,191 A | * | 10/1994 | Bobis | 425/118 |

FOREIGN PATENT DOCUMENTS

WO    WO 8902575 A1 *  3/1989

* cited by examiner

*Primary Examiner*—Yogendra N. Gupta
*Assistant Examiner*—Dimple Bodawala

(57) ABSTRACT

A top for use with an ice cream container, the top keeping the ice cream contained therein fresh, tasteful, and easily dispensable. When the top is placed or fitted into an ice cream container, the top is pressed down into the ice cream. The force of the top being pressed downward shapes the surface of the ice cream to conform to the shape of the top. As the top is pressed downward, air escapes through the holes and the inner surface of the top touches the surface of the re-shaped ice cream. The top also has at least one projection, which may be moved independently of the rest of the top, the projection pressed or projected down into the ice cream. The depression made by the projection facilitates a spoon or serving instrument to be easily inserted into the ice cream.

5 Claims, 2 Drawing Sheets

DEVICE FOR KEEPING AND SERVING ICE CREAM

FIELD

The present invention relates to containers and similar devices for storing perishable food; more particularly the present invention comprises a device for use with ice-cream containers, whereby the device keeps the ice cream fresh and free from contamination by ice crystals, and facilitates rapidly serving hardened ice cream

BACKGROUND

Almost everyone likes ice cream. But how many times have persons opened a container and enjoyed part of the contents, but later found the remaining ice cream spoiled by ice crystals formed by infiltrating air? Quite often!

And furthermore, once an ice cream container is opened, one has to wait several minutes for the ice cream to soften enough to serve.

The inventors believe this happens far too often, and therefore set out to solve this problem, that is to invent a device that will keep ice cream in a container fresh, and once the container is opened, the device facilitates rapid serving of the ice cream.

SUMMARY

Mindful of the problems of ice-crystal contaminated ice cream, and other frozen foods that are ruined by air exposure, herein is disclosed a device for an ice cream container, the device keeping the ice cream contained therein fresh, tasteful, free from ice-crystals and easily dispensable. Once opened, the device, having created indentations within, permits the ice cream to be more easily served.

The device is shaped and adapted to fit into a container and to press down onto the contents inside, whereby the contents are conformed to the shape of the device, and air is exhausted from any pre-existing space between the device and the contents, the air exhausted out of the device from two openings made in the device. The device is also made with a projection that penetrates into the ice cream, the projection causing an indentation or plurality of indentations into which a spoon or serving scoop can be inserted, whereby cold, hard ice cream may be removed more easily.

An object of the present invention is to provide a means for containing and facilitating the containment and storage of ice cream.

A second object of the present invention is a means for keeping air from entering the container and infiltrating the ice cream contained therein.

And another object of the invention is a means by which indentations may be made in the ice cream to permit insertion of a spoon or serving instrument.

The foregoing and other objects and advantages will appear from the description to follow. In the description reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention.

DETAILED DESCRIPTION

An Exemplary Embodiment

The invention comprises a device for use with an ice cream container, the device keeping the ice cream contained therein fresh, tasteful, and easily dispensable. Furthermore, the device is provided with means whereby indentations are made in ice cream so that a serving instrument may be inserted for easy removal.

Figure 1:
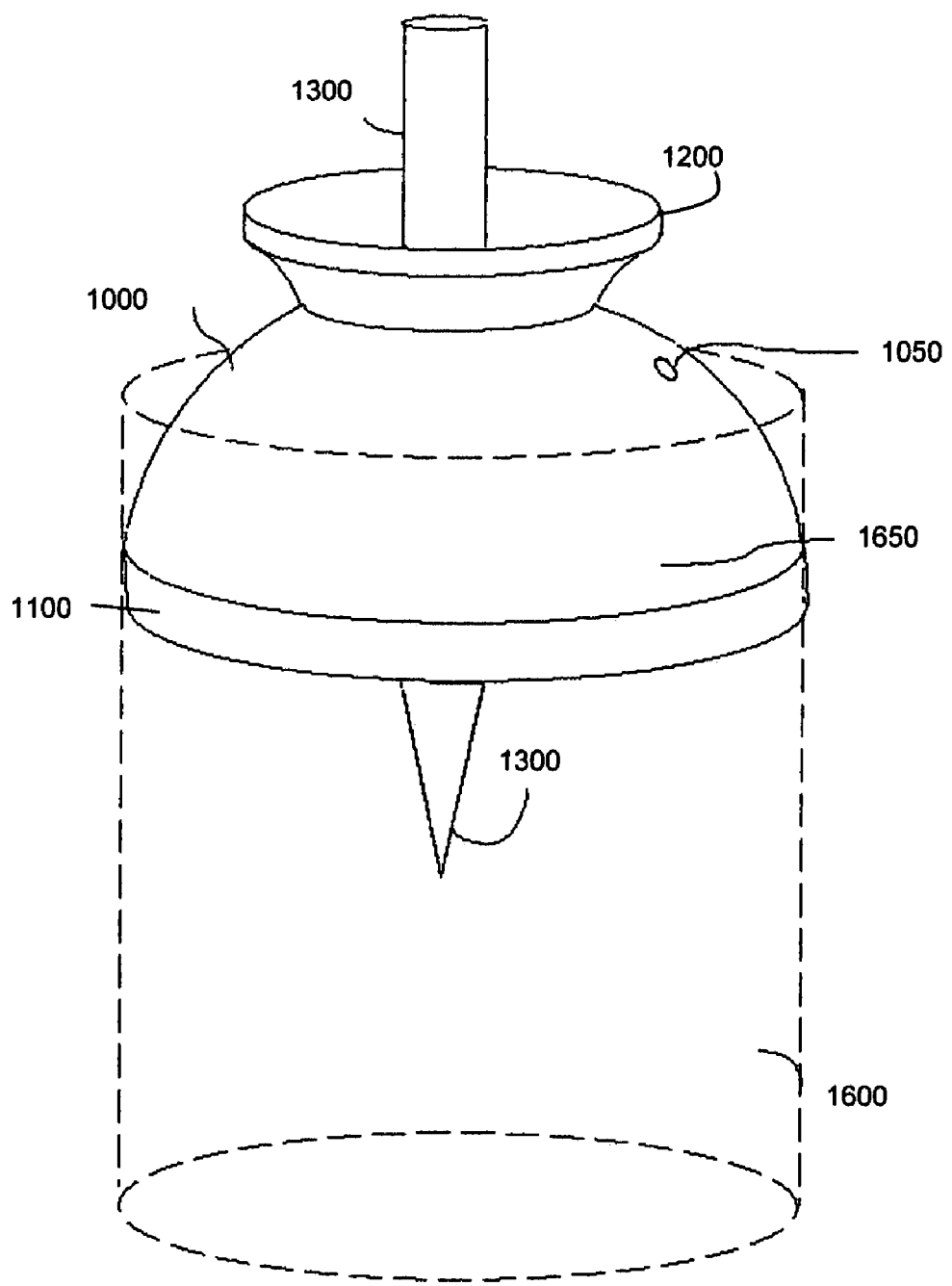
FIG. 1 shows the exemplary embodiment of the invention being one form of the invention, that form in a shape compatible with ice cream containers, wherein the invention can be round, square and various sizes to conform to various forms of ice cream containers.

With reference to FIG. 1, the device 1000, serving partially as a lid or top to a container, is made from metal, plastic or similar materials. The device or lid or cover is made in different sizes and shapes to conform to different sizes and shapes ice cream containers, for example containers that are cylindrical, square or any other arbitrary, but fixed shape.

With reference to FIG. 1, the device 1000 fits tightly into the ice cream container 1500, and is made to slide up and down inside the container 1500 by pushing the device 1000 into, or pulling the device out of the container 1500. The device 1000 has a handle 1200 for grasping or holding when the device 1000 is inserted into or pulled from within a container 1500. The device 1000 has a more-or-less hollow or convex shape, although other shapes may be fashioned, as long as the shape is compatible with fitting tightly into the container 1500.

When the device 1000 is placed or fitted into an ice cream container 1500, the device 1000 is pressed down into the ice cream 1600. The force of the device 1000 shapes the surface 1650 of the ice cream 1600 to conform to the shape of the device 1000. Air between the surface 1650 of the ice cream 1600 and the device 1000 is compressed and forced out of at least one small hole or opening 1050 in the device. As the device 1000 is pressed downward, air trapped between the inner surface of the device 1000 and the surface of the ice cream 1650 is forced out through a hole 1050 in the device. The device is pressed down until the inner surface of the device 1000 touches the surface 1650 of the re-shaped ice cream 1600. By exerting additional downward force against the device 1000, the underside of the device 1000 forces the surface 1650 of the ice cream 1600 to conform to the shape of the device 1000.

Again with reference to FIG. 1, the device 1000 has at least one projection 1300 that is pushed down into the ice cream 1600 as downward pressure is exerted on the device 1000. When the device is removed, depressions made by the projection are present in the ice cream 1600, thereby making it much easier to insert and utilize a spoon or the like to serve the ice cream.

It will be appreciated that the only portion of the ice cream 1600 that is exposed to air is a minute portion of the ice cream 1600 that extrudes through the hole 1050. This very small volume may be ignored or even scraped off, preserving almost all of the ice cream 1600 from being contaminated by ice crystals.

When the device 1000 is pressed down, the vertical edges 1100 of the device 1000 scrapes ice cream 1600 from the sides of the container 1500, forcing the ice cream 1600 to the center of the container 1500, and therefore makes all the ice cream 1600 in the container 1500 available for dispensing.

Use of the Projection

Figure 2:
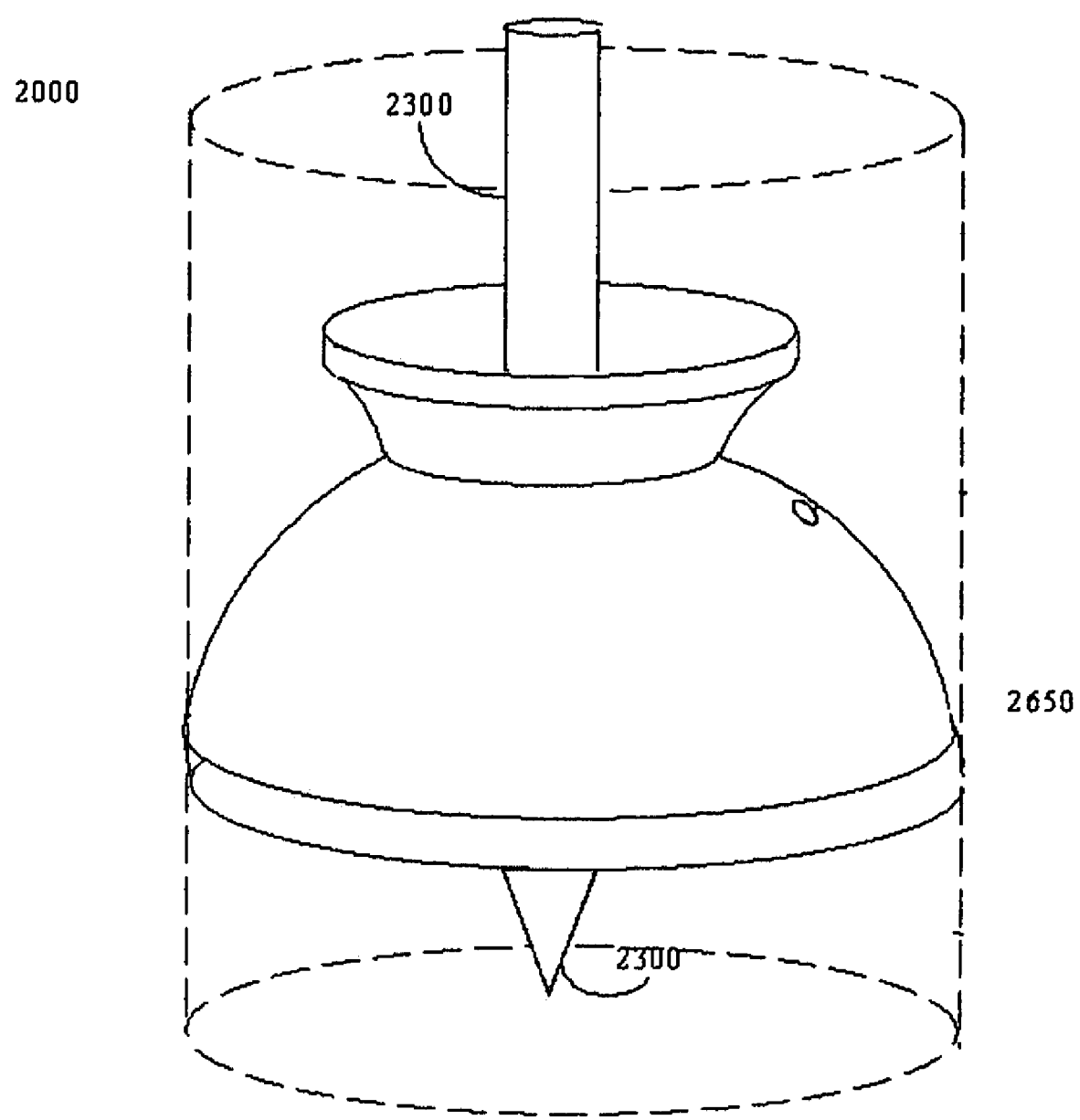
FIG. 2 shows a view of the exemplary embodiment of the invention in use, wherein a projection is pressed into the ice cream while in the container, and whereby the indentation created thereby facilitates dispensing the ice cream.

With reference to FIG. 2, it is seen the projection 2300 creates a depression in the ice cream 1600, making it easier to insert a spoon or serving scoop. The projection may be made fixed with respect to the rest of the device 2000, or the projection may be made to slide within the top of the device and inserted into the ice cream independently of pressing the device into the ice cream.

Other Uses of the Device

It will be appreciated that the device disclosed may be used with other types of materials that are spoiled or altered by contact with air.

DISCLOSURE SUMMARY

In the exemplary embodiment a device for preserving and aiding in dispensing ice cream is disclosed, the device capable of keeping ice crystals from forming and contaminating the ice cream. The exemplary device provides a simple and cost-effective means for storing and preserving ice cream, and for preparing ice cream to facilitate rapid serving.

While the invention may be practiced in other embodiments and variations thereof of, it will be appreciated that the invention is most properly defined and delineated by the claims that follow.

What is claimed is:

1. A top for a container storing ice cream, the top having a projection extending downward into the container, the top conformable to, and received into the opening of the container, the top operable as a piston within the container to displace air as it moves into the container, whereby the inside surface of the top receives the ice cream, causing the ice cream to comply with the inside surface of the top, and all air to be removed between the substance and the top, while the projection penetrates the ice cream and making an indentation in the ice cream, whereby the ice cream may be removed easily by a spoon or the like inserted into the indentation.

2. The top of claim 1, wherein the projection may be moved within the top.

3. The top of claim 1, wherein the projection is moveable within the top.

4. A top for an ice-cream container, the top conformable to the inside of the ice-cream container, the top made to slide inside the container, the top trapping and expelling air as the device is pushed into the container, the top having at least one projection that penetrates ice cream within the container, whereby the ice cream is kept fresh and the depression made by the at least one projection facilitates easy removal of the ice cream.

5. The top of claim 4, wherein the device forces ice cream to the center of the container.

\* \* \* \* \*